United States Patent [19]
LaGreca et al.

[11] Patent Number: 6,050,543
[45] Date of Patent: Apr. 18, 2000

[54] TWO-PIECE SOLENOID VALVE

[75] Inventors: Alfred J. LaGreca, Hingham; David E. Butz, Groton, both of Mass.

[73] Assignee: Research and Development Products LLC, Hingham, Mass.

[21] Appl. No.: 09/260,409

[22] Filed: Mar. 1, 1999

[51] Int. Cl.$^7$ ..................................................... F16K 31/06
[52] U.S. Cl. ....................................................... 251/129.21
[58] Field of Search ........................... 251/129.21, 129.15

[56] References Cited

U.S. PATENT DOCUMENTS

| | | |
|---|---|---|
| 2,267,515 | 12/1941 | Wilcox et al. .................. 251/129.21 X |
| 2,561,922 | 7/1951 | Hall .................................... 251/129.21 |
| 2,614,584 | 10/1952 | Goepfrich .......................... 251/129.21 |
| 2,830,743 | 4/1958 | Rimsha et al. .................. 251/129.21 X |
| 3,712,581 | 1/1973 | Parlow . |
| 3,955,795 | 5/1976 | Neely . |
| 3,972,505 | 8/1976 | Padula . |
| 3,974,998 | 8/1976 | Wood . |
| 4,524,947 | 6/1985 | Barnes et al. . |
| 4,621,788 | 11/1986 | DeLew et al. .................. 251/129.21 X |
| 4,638,973 | 1/1987 | Torrence ......................... 251/129.21 X |

FOREIGN PATENT DOCUMENTS

| | | |
|---|---|---|
| 33053 | 11/1964 | Germany . |
| 62-258274 | 11/1987 | Japan . |
| 294308 | 1/1971 | U.S.S.R. . |
| 1116257 | 9/1984 | U.S.S.R. . |

*Primary Examiner*—Kevin Lee
*Attorney, Agent, or Firm*—Cesari and McKenna

[57] ABSTRACT

A solenoid valve comprises a conduit having first and second ports and a valve seat in the conduit between the ports. A ferro-magnetic valve member is positioned in the conduit between one of the ports in the valve seat which valve member is movable between a closed position wherein the valve member seats against the valve seat and isolates the two ports and an open position wherein the valve member is spaced from the valve seat and allows fluid flow between the ports. The valve also includes a multi-turn coil having an axial passage therethrough which passage is dimensioned to slidably receive the conduit. The valve member is normally biased to one of its two positions in the conduit. However, when the conduit is received in the coil passage and the coil is energized, the electromagnetic field produced by the coil moves the valve member to its other position thereby either opening or closing the valve depending upon the initial state of the valve member. The valve conduit and its contents are separable from the solenoid coil so that the conduit and its contents can be separately handled and sterilized and can be installed in various apparatus equipped with similar solenoid coils for actuating the valve member.

10 Claims, 3 Drawing Sheets

TWO-PIECE SOLENOID VALVE

This invention relates to fluid valves. It relates especially to a two-piece electromagnetic or solenoid valve.

BACKGROUND OF THE INVENTION

The solenoid valve is a well-known device for controlling fluid flow. It invariably consists of a multi-turn conductive coil having an axial passage. A ferro-magnetic valve member is movable axially within the passage toward and away from a valve seat located between an inlet port and an outlet port. The valve member is formed with a sealing surface and is movable between a closed position wherein the sealing surface is seated against the valve seat so as to isolate the inlet and outlet ports and an open position wherein the sealing surface is spaced from the valve seat allowing fluid flow between those ports. Usually, the valve member is biased toward its open or closed position and is moved to the opposite position by the magnetic field produce by the coil when a voltage is applied to the coil. In other words, the valve may be opened or closed when the coil is energized depending upon the initial state of the valve member.

In traditional solenoid valves of this general type, all of the components of the valve form a unitary assembly. In other words, the flow path through the valve is fixed and the valve member is permanently mounted within the coil and is not easily removable. Therefore, if the fluid flow path through the valve has to be sterilized, the entire valve including the coil must be subjected to sterilization.

Also, valves of this type are usually dedicated to a particular instrument or apparatus. To be used in a fluid control application, fluid connections must be made between the valve inlet and outlet ports and other components of the instrument or apparatus, which is time consuming and expensive. Once assembled in the particular instrument or apparatus, the components of the valve cannot be used for any other purpose. That is, all components of the valve are dedicated to that particular application.

SUMMARY OF THE INVENTION

Accordingly, the present invention aims to provide a solenoid valve whose fluid-contacting parts can be sterilized without sterilizing other more easily damaged parts of the valve.

A further object of the invention is to provide such a valve whose fluid-contacting parts can be used in different applications.

Yet another object of the invention is to provide a valve of this type which can have a variety of different fluid flow configurations.

Another object is to provide a solenoid valve whose fluid-contacting portions may be made as an inexpensive disposable item and/or as a part of a closed fluid system.

Other objects will, in part, be obvious and will, in part, appear hereinafter.

The invention accordingly comprises the features of construction, combination of elements and arrangement or parts which will be exemplified in the following detailed description, and the scope of the invention will be indicated in the claims.

Briefly, our valve comprises a fluid conduit or body having inlet and outlet ports and a valve seat in the conduit between those ports. A ferro-magnetic valve member is positioned between one of the ports and the valve seat, which valve member is movable between a closed position wherein the valve member seats against the valve seat and isolates the two ports and an open position wherein the valve member is spaced from the valve seat allowing fluid flow between the two ports. The valve also includes a multi-turn coil having an axial passage through the coil which passage is dimensioned to slidably receive the conduit so that when the conduit is received in the passage and the coil is energized, the valve member is moved toward one of its open and closed positions. Preferably, the valve includes a biasing member such as a spring or magnet to bias the valve member to one position or the other when the coil is not energized.

This two-part valve construction enables the coil and any other non fluid-contacting parts of the valve to be permanently mounted in the apparatus utilizing the valve. The valve conduit and valve member therein, on the other hand, being separable from the coil, can be removed easily from the apparatus for handling purposes, sterilization and the like. Furthermore, the separable valve conduit may be incorporated into a closed fluid system along with other similar valves, fluid reservoirs, detectors of one kind or another, fluid sumps, etc. to facilitate blending of, or measurement of various characteristics of, the fluid(s) flowing through the valve(s) in a completely closed or sealed environment.

In addition, the valve conduit(s) can be removed from the valve coil(s) in one instrument or apparatus and plugged into a different apparatus fitted with similar coil(s) to receive the conduit(s). Thus, the fluid-contacting parts of the valve(s) can be used in different applications without compromising the integrity of the closed fluid system.

It is also apparent that the fluid-contacting parts of the valve can be fabricated of relatively inexpensive medical grade plastic materials which can withstand sterilization and the fluid flowing through the valve. Also, they can be designed as a disposable item while the other more expensive parts of the valve such as the coil can be reused with a succession of different valve conduits.

BRIEF DESCRIPTION OF THE DRAWINGS

For a fuller understanding of the nature and objects of the invention, reference should be made to the following detailed description taken in connection with the accompanying drawings, in which.

DETAILED DESCRIPTION OF THE PREFERRED EMBODIMENTS

Figure 1:
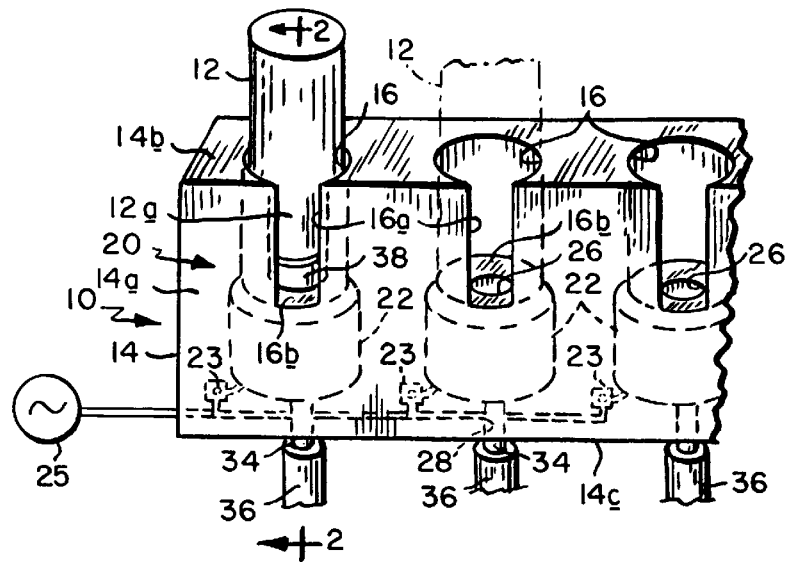
FIG. 1 is a fragmentary isometric view of apparatus for dispensing a plurality of fluids incorporating a two-piece solenoid valve according to the invention.

FIG. 1 of the drawings shows apparatus for dispensing fluids from a plurality of self venting or collapsible containers 12. The illustrated container 12 is a flexible plastic bottle having a neck 12a whose end is threaded in the usual way. For example, the apparatus 10 may be a pH calibration apparatus in which case bottles 12 may contain standard liquids having different pH values.

In any event, apparatus 10 comprises a housing 14 having a front wall 14a, a top wall 14b and a bottom wall 14c. A lengthwise series of vertical passages 16 extend down into housing 14 from top wall 14b. These passages are sized to support an inverted container 12 such that the container neck 12a extends down into the passage. To enable viewing of the container neck 12a, a vertical slot 16a is provided in the housing front wall 14a in front of each passage 16, which slot opens into that passage. Thus, by viewing the container neck 12 through slot 16a, an observer can tell when that container is almost empty of fluid.

Figure 2:
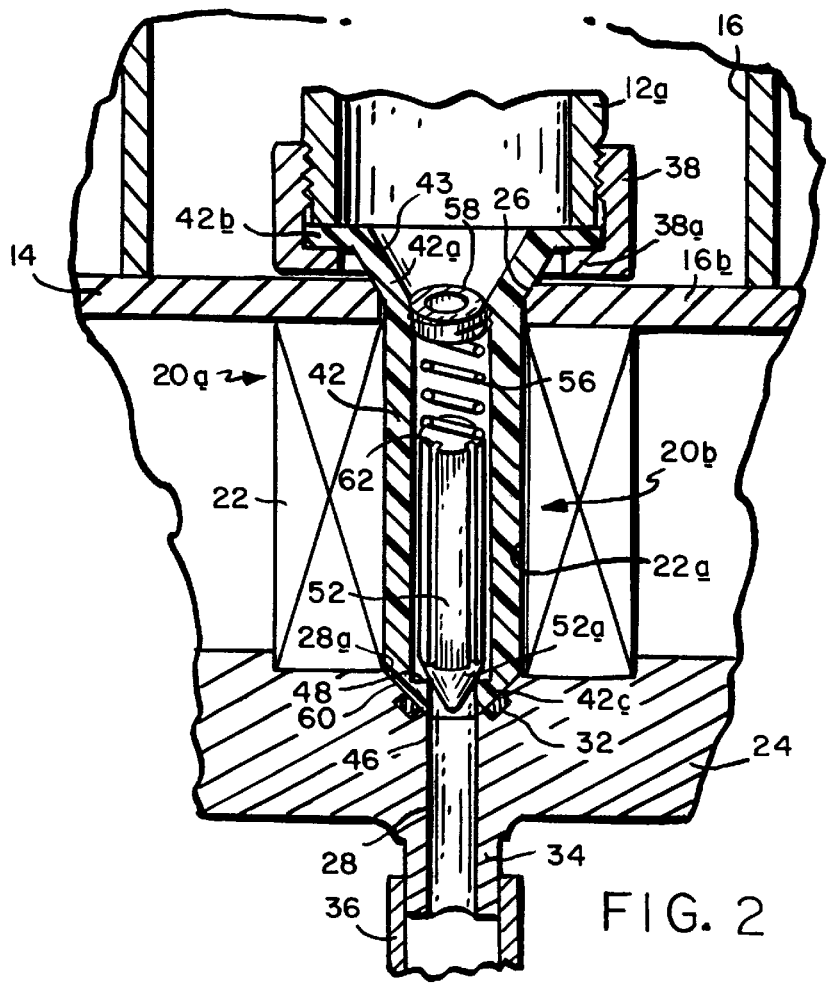
FIG. 2 is a sectional view taken along line 2—2 of FIG. 1 on a much larger scale.

Referring to FIGS. 1 and 2, associated with each passage 16 containing a container 12 is a solenoid valve shown generally at 20. Valve 20 is composed of two separable sections, namely a coil section 20a and a conduit section 20b. Coil section 20a is basically a multi-turn wire coil 22 having an axial passage 22a. Coil 22 is mounted to a base 24 in housing 14 directly below the floor 16b of that passage such that the coil passage 22a is coaxial with passage 16. Each coil 22 is connected to a voltage source 25 via a separate switch 23 mounted to housing front wall 14a.

As shown in FIG. 2, a flared opening 26 is provided in the passage 16 floor 16b and opens into the solenoid passage 22a. Also, a vertical passage 28 is formed in base 14 directly below the solenoid passage 22a, the upper end 28a of that passage being flared as shown in FIG. 2 to the diameter of coil passage 22a. Preferably also, that flared end 28a is grooved to accept an O-ring 32 for reasons that will become apparent.

A tubular stem or nipple 34 extends down from base 24 at the location of each passage 28. The upper end of a tube 36 may be connected to each stem 34. The tubes 36 may be merged together or lead to various destinations depending upon the function of the apparatus 10.

Still referring to FIGS. 1 and 2, the conduit section 20b of valve 20 is made separable from coil section 20a and is actually attached to container 12. More particularly, the conduit section 20b is removably attached to the threaded end of container neck 12a by a more or less conventional annular threaded cap 38, the cap being screwed onto the end of the container neck 12a is shown in FIG. 2. Similar caps are used on various known dispensing bottles such as baby bottles and the like.

As shown in FIG. 2, valve section 20b comprises a fluid conduit 42 whose upper end segment 42a is flared out to form a funnel-shaped inlet 43. A radial flange 42b is present at the upper end of segment 42a whose outer diameter is slightly smaller than the inner diameter of cap 38. That flange may be captured by a radially inwardly extending flange 38a on cap 38 when the cap is turned down onto the container neck 12a thus providing a fluid-tight seal between the container 12 and the valve conduit 42. The lower end 42c of valve conduit 42 is closed except for a small axial passage 46 the lower end of which constitutes the outlet from the conduit. The upper end or edge of passage 46 defines a valve seat 48 which, as shown in FIG. 2, is located between the conduit inlet 43 and the outlet 46.

Slidably positioned in conduit 42 is a generally cylindrical valve member 52 whose lower end 52a is tapered. The valve member 52 is movable between a closed position shown in FIG. 2 wherein the valve member end 52a seats against the valve seat 48 so that no fluid can flow between the conduit inlet 43 and outlet 46 and an open position wherein that end 52a is spaced above valve seat 48 so that fluid is free to flow through the valve conduit. Preferably, valve member 52 is biased toward its closed position by a coil spring 56 compressed between the valve member and a threaded annular retainer 58 turned down into threads provided in the interior wall of conduit 42 at the foot of conduit segment 42a.

To facilitate fluid flow through the valve conduit 42 when valve member 52 is in its open position, a circular array of lengthwise grooves 62 may be provided around valve member 52. Alternatively, such grooves may be provided in the interior wall of conduit 42 adjacent to the valve member; see FIG. 3.

When a container 12 is positioned in a housing passage 16 as shown at the left side of FIG. 1, the valve conduit 42 attached to that container is slidably received in the passage 22a of the underlying coil 22 so that the end 42c of that conduit seats against the O-ring 32 at the top of the underlying base passage 28. Preferably, the end 42c of the conduit has an outside taper 60 to provide a fluid tight seal between the conduit 42 and base 24.

Normally, no fluid can flow from the container 12 through the valve 20 to outlet tube 36 because the valve member 52 is biased to its closed position by spring 56. However, when the coil 22 is energized by closing the switch 23 controlling that coil, the coil produces a magnetic field which lifts the valve member 52 against the bias of spring 56 allowing fluid to flow from container 12 through valve 20 to tube 36.

It will be appreciated from the foregoing that since the valve section 20b is separable from section 20a, section 20b can be removed along with container 12 in order to refill the container or to sterilize the container and valve section 20b or even to install that container and valve section in a completely different apparatus equipped with a coil section similar to section 22a. Furthermore, the conduit section 20b can be made of inexpensive plastic material so it can be disposed of after use, while the more expensive part of the valve comprising section 20a remains with the apparatus 10.

Figure 3:
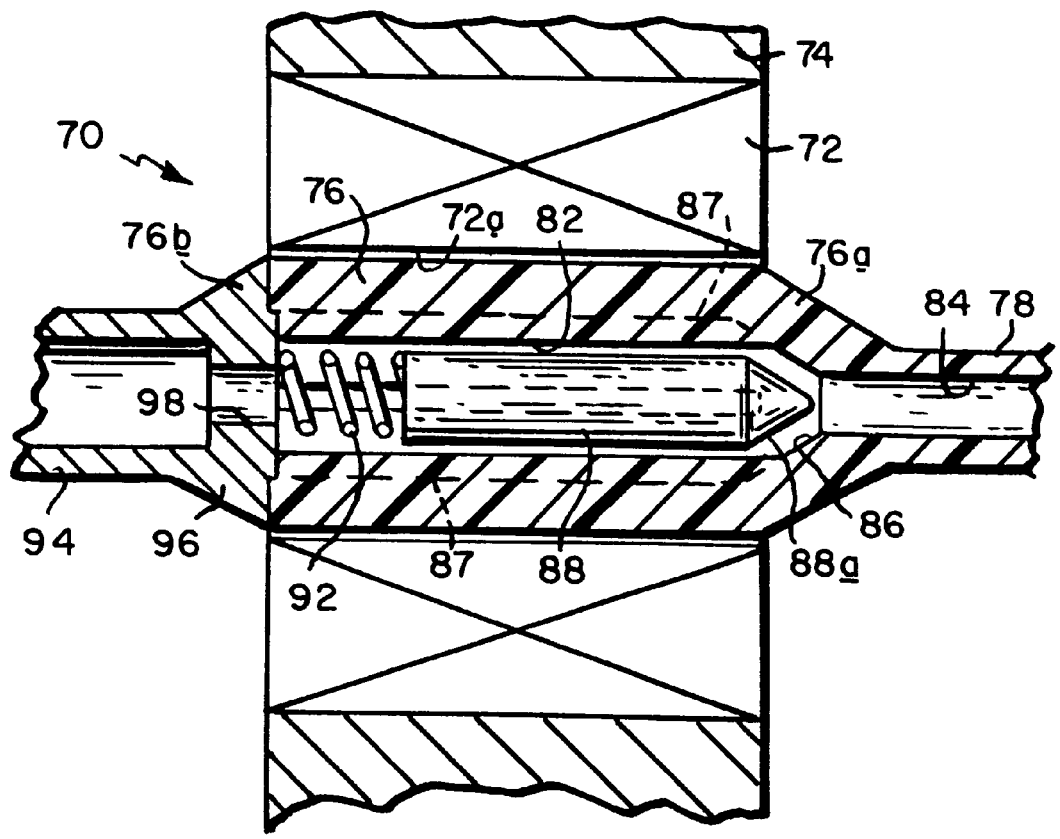
FIG. 3 is a longitudinal sectional view of a second embodiment of our valve.

Refer now to FIG. 3 which illustrates an in-line valve embodiment 70 which can have either a vertical or the illustrated horizontal orientation. Valve 70 comprises a solenoid coil 72 ordinarily secured to a support member 74 of the particular apparatus utilizing the valve. Coil 72 has an axial passage 72a for slidably receiving a valve conduit 76 which is separable from coil 72 and the apparatus in which the coil is installed.

The valve conduit 76 is made in two pieces, namely a generally cylindrical outlet section 76a whose outer diameter is slightly smaller than the coil passage 72a. Section 76a is open at one end, i.e., the left end as viewed in FIG. 3. The opposite or right hand end of section 76a is necked down to form a tubular outlet 78. The valve conduit outlet section 76a has a relatively large diameter axial passage 82 extending from the left end of that section almost to the opposite end of that section where that passage 82 necks down to join a passage 84 in the outlet 78. The necked-down end of passage 82 defines a tapered valve seat 86. Preferably, the wall of passage 82 to the left of the valve seat has longitudinal grooves 87.

Positioned in passage 82 is a generally cylindrical ferromagnetic valve member 88 having a tapered end 88a facing valve seat 86. The valve member 88 is movable along passage 82 between an open position shown in FIG. 3 wherein the valve member end 88a is spaced from the valve seat 86 and a closed position wherein the valve member end 88a seats against the valve seat 86. Preferably, the valve member is biased toward its closed position by a coil spring 92 bearing against the left end of valve member 88.

The valve conduit 76 also includes an inlet section 76b joined to the left or open end of section 76a as shown in FIG.

3. Section 76b includes a tubular inlet 94 having an outwardly flared end 96 which butts against the left hand end of section 76a so as to capture and compress spring 92. An axial passage 98 in the section end 96 establishes fluid communication between inlet 94 and passage 82. The valve conduit sections 76a and 76b may be secured together by an adhesive, solvent bond, heat weld or other suitable means.

When solenoid coil 72 is not energized, the valve member 88 is seated against valve seat 86 by spring 92 so that no fluid can flow between inlet 94 and outlet 78. However, when coil 72 is energized, the magnetic field produced by the coil retracts the valve member 88 away from the valve seat 86 so that fluid can flow between inlet 94 and outlet 78.

As with the valve conduit in FIGS. 1 and 2, the valve conduit 76 is separable from its coil 72 so that it can be sterilized easily and can be incorporated into a closed fluid system or loop and be moved from one apparatus equipped with a coil 72 to another such apparatus.

Figure 4:
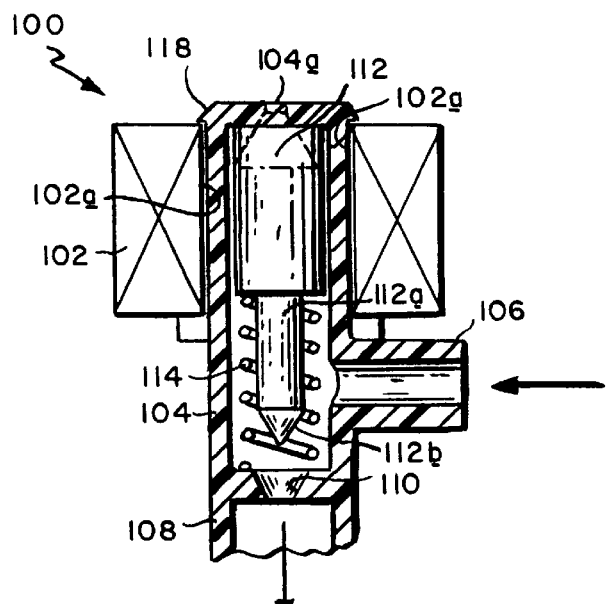
FIG. 4 is a similar view of another valve embodiment.

As evident from FIGS. 2 and 3, the separable conduit section of our valve may have various configurations. FIG. 4 shows a solenoid valve indicated generally at 100 comprising a toroidal solenoid coil 102 with an axial passage 102a and a separable conduit section including a valve conduit 104 having an inlet 106 disposed at right angles to the valve conduit outlet 108. As with the other valve embodiments, the valve conduit 104 is formed with an internal valve seat 110 between inlet 106 and outlet 108. In this valve embodiment, the upper end of the valve conduit 104 is closed by an end wall or cap 104a during final assembly of the conduit section.

Slidably positioned in the conduit 104 between end wall 104a and valve seat 110 is a ferro-magnetic valve member 112 which is movable along conduit 104. Valve member 112 has a reduced diameter end segment 112a facing valve seat 110 and the end 112b of that segment is tapered. The valve member 112 is moved between an open position shown in FIG. 4 wherein the tapered end 112b of the valve member is spaced away from the valve seat 110 so fluid can flow between valve inlet 106 and outlet 108. In the valve illustrated in that figure, the valve member is biased toward its open position by a coil spring 114 compressed between valve seat 110 and a shoulder at the top of the valve member segment 112a.

The valve conduit 104 is adapted to be slidably received in the axial passage 102a of coil 102 as shown in FIG. 4. The conduit may be releasably retained in that passage by the engagement of a small external radial rib or overhang 118 on conduit end wall 104a over the top of coil 102.

The valve member 112 is normally maintained in its open position shown in FIG. 4 by spring 114. However, when the conduit 104 is inserted into the coil passage 102a and the coil is energized, the electromagnetic field produced by the coil moves valve member 112 to a closed position wherein the valve member end 112b seats against the valve seat 110 thereby preventing fluid flow from inlet 106 to outlet 108.

In some applications, the two-way valve in FIG. 4 may be modified to enable three-way operation. More particularly, the end wall on cap 104a may be formed as a valve seat with an inlet/outlet and the upper end of valve member may be tapered all as shown in phantom in FIG. 4. As such when valve member 112 seats opposite one seat it un-seats from the other seat. Thus, fluid at inlet 106 is routed in one direction or the other, depending upon the state of valve member 112.

Figure 5:
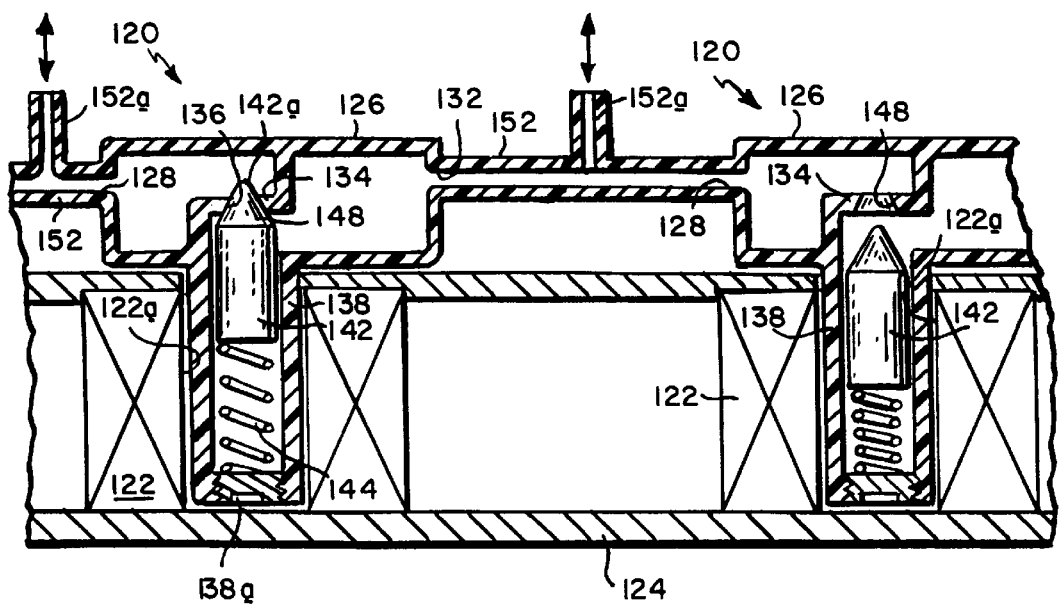
FIG. 5 is a view similar to FIG. 2 showing yet another valve embodiment incorporated into a fluid control apparatus.

FIG. 5 shows a succession of valves 120 incorporating our invention for controlling in-line fluid flow. Each valve 120 comprises a solenoid coil 122 mounted in an apparatus 124. In the illustrated apparatus 124, two such coils 122 are shown each having an axial passage 122a accessible from the top of apparatus 124. Each valve 122 also includes a valve conduit 126 having at one end a first port 128 which may be an inlet or an outlet and a second port 132 at its opposite end which may be an outlet or an inlet. Disposed between the two ports is a partition 134 having a transverse opening 136 therein. Each conduit 126 has a side branch 138 opposite the corresponding opening 136. One end of the side branch 138 opens into conduit 126; the opposite end of the side branch is closed by an end wall 138a. Slidably positioned in each side branch 138 is a ferro-magnetic valve member 142 which is slidable along the side branch toward and away from partition 134. The valve member 142 has a tapered end 142a facing the opening 136 in the partition and the valve member is biased toward that opening by a coil spring 144 compressed between the side branch end wall 138a and the valve member 142 therein. Thus, valve member 142 normally reposes in a closed position shown at the left side of FIG. 5 wherein its end 142a seats against a valve seat 148 at the edge of opening 136. However, when the side branch 138 is received in the coil passage 122a and the coil is energized, the electro-magnetic field produced by the coil causes the valve member 142 to move to an open position away from the valve seat 148 as seen at the right side of FIG. 5 so that fluid can flow between the two ports 128 and 132 of the valve conduit 126.

As shown in FIG. 5, a plurality of the valves 120 may be connected in series by connecting tubes 152 formed integrally with the conduits 126. Furthermore, those connecting tubes 152 may be provided with nipples 152a which may be connected to a fluid source such as a reservoir or a fluid destination such as a sump, fluid detection apparatus or the like.

If desired, the interconnected valves 120 may be incorporated into a closed fluid loop or system for routing fluid between various sources and destinations. For example, fluid introduced into the left hand valve 120 through the left hand nipple 152a may be routed to the right hand valve 120 and right hand nipple 152a by opening the left hand valve 120. Assuming that the left hand valve 120 were opened by energizing its coil 122, the fluid leaving that valve may be routed via the right hand nipple 152a to a particular destination such as a detector or conveyed through the right hand valve 120, depending upon whether or not that right hand valve were open or closed. Alternatively, a different fluid may be added to the fluid stream passing through the right hand valve 120 via the right hand nipple 152a.

As is apparent from FIG. 5, the fluid-contacting portions of the valves 120 are separable from their respective coils 122 so that those separable components can be sterilized and otherwise moved about without affecting the more expensive components of the valve including coils 122. In addition, the separable components of several valves connected in series as shown can be formed as a single sealed unit and can be sterilized separately from the coils 122. Furthermore, that sealed unit may be made of relatively inexpensive plastic material so as to constitute a disposable item, leaving the more expensive portions of the valves including coils 122 to be reused with similar disposable units.

It will thus be seen that the objects set forth above, among those made apparent from the preceding description, are efficiently attained. It will also be understood that certain changes may be made to the above constructions without departing from the scope of the invention. For example, instead of having the solenoid coil constitute the fixed component of the valve, the valve conduit may be fixed to a particular apparatus, with the coil being separable from that fixed component. Thus, it is intended that all matter contained in the above description or shown in the accompanying drawings, shall be interpreted as illustrative and not in a limiting sense.

It is also to be understood that the following claims are intended to cover all of the generic and specific features of the invention described herein.

What is claimed is:

1. A valve comprising a disposable plastic fluid conduit having an inner wall, a first port, a second port and a valve seat in the conduit between said ports;

a ferro-magnetic valve member positioned in the conduit between one of said ports and the valve seat, said valve member being movable between a closed position wherein the valve member seats against the valve seat and isolates the first and second ports and an open position wherein the valve member is spaced from the valve seat allowing fluid flow between said ports;

a base having an outlet;

a multi-turn coil mounted to the base, said coil having two ends and an axial passage aligned with said outlet and dimensioned to slidably receive said conduit;

a seal between second port and said outlet so that the conduit can unobstructably slide in and out of said passage so that when the conduit is received in said passage a seal is established between the passage and the outlet whereby when a voltage is applied to said ends of the coil and, the valve member is moved toward one of said closed and open positions whereby to stop or start fluid communication between the fluid conduit and the outlet.

2. The valve defined in claim 1 and further including biasing means biasing the valve member toward the other of said closed and open positions.

3. The valve defined in claim 2 wherein the biasing means is a coil spring engaging the valve member, and further including means for applying a voltage across said ends of the coil.

4. The valve defined in claim 1 wherein said conduit has a flared end defining said inlet port and an opposite end defining said outlet port and further including means for releasably connecting said flared end to a container.

5. The valve defined in claim 4 wherein the connecting means include an internally threaded annular cap for clamping said conduit flared end to an externally threaded container outlet.

6. The valve defined in claim 1 and further including at least one lengthwise groove in the valve member.

7. The valve defined in claim 1 and further including at least one lengthwise groove in the interior wall of the conduit adjacent to the valve member.

8. The valve defined in claim 1 wherein said inlet and said outlet are located at opposite ends of said conduit.

9. The valve defined in claim 1 wherein said inlet and said outlet are orthogonal to each other.

10. The valve defined in claim 1 wherein said conduit includes a tubular side branch located opposite said valve seat and said valve member is slidably positioned in said side branch.

\* \* \* \* \*